(12) United States Patent
Steinert et al.

(10) Patent No.: US 12,518,412 B2
(45) Date of Patent: Jan. 6, 2026

(54) METHOD AND DEVICE FOR LIGHT FIELD MICROSCOPY

(71) Applicant: Carl Zeiss Microscopy GmbH, Jena (DE)

(72) Inventors: Jörg Steinert, Jena (DE); Yauheni Novikau, Jena (DE); Daniel Schwedt, Jena (DE); Thomas Egloff, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 18/494,175

(22) Filed: Oct. 25, 2023

(65) Prior Publication Data

US 2024/0135565 A1   Apr. 25, 2024
US 2024/0233158 A9   Jul. 11, 2024

(30) Foreign Application Priority Data

Oct. 25, 2022   (DE) ............... 10 2022 128 079.9

(51) Int. Cl.
| | |
|---|---|
| *G06T 7/557* | (2017.01) |
| *G02B 21/08* | (2006.01) |
| *G02B 21/36* | (2006.01) |
| *H04N 13/20* | (2018.01) |
| *H04N 23/951* | (2023.01) |
| *H04N 23/957* | (2023.01) |

(52) U.S. Cl.
CPC ............ *G06T 7/557* (2017.01); *G02B 21/08* (2013.01); *G02B 21/365* (2013.01); *H04N 13/20* (2018.05); *H04N 23/951* (2023.01); *H04N 23/957* (2023.01); *G06T 2207/10056* (2013.01)

(58) Field of Classification Search
CPC .... G02B 21/08; G02B 21/082; G02B 21/365; G02B 21/367; G02B 27/0075; G06T 2207/10052; G06T 2207/10056; G06T 5/50; G06T 7/557; H04N 13/20; H04N 23/951; H04N 23/957
USPC .......................................................... 348/43
See application file for complete search history.

(56) References Cited

U.S. PATENT DOCUMENTS 9,159,119 B2 *   10/2015   Shechtman .......... H04N 23/651
2020/0250856 A1 *   8/2020   Baumgart ................. G06T 5/80

FOREIGN PATENT DOCUMENTS

WO        2022043438      3/2022
WO   WO-2022043438 A1 *   3/2022

OTHER PUBLICATIONS

Machine translation of WO 2022043438 A1 (Year: 2022).*
Mar. 3, 2022 Search Report issued by the German Patent Office for German Patent Application No. DE 10 2020 122 605 A1. [English Abstract included] 28 pages.

* cited by examiner

*Primary Examiner* — Christopher S Kelley
*Assistant Examiner* — Ana Picon-Feliciano
(74) *Attorney, Agent, or Firm* — DUANE MORRIS LLP

(57) ABSTRACT

A method and apparatus for light field microscopy, wherein the following method steps are performed: a) measuring an image data record of a sample using a light field arrangement; b) creating at least one partial data record from the image data record; c) reconstructing a three-dimensional object from the partial data record created in step b).

31 Claims, 5 Drawing Sheets

METHOD AND DEVICE FOR LIGHT FIELD MICROSCOPY

RELATED APPLICATION

The present application is a U.S. National Stage application of German Application No. DE 10 2022 128 079.9 filed on Oct. 25, 2022, the contents of which are herein incorporated by reference in their entirety.

FIELD OF THE INVENTION

In a first aspect, the invention relates to a method for light field microscopy. In a second aspect, the invention relates to an apparatus for light field.

BACKGROUND OF THE INVENTION

A generic apparatus for light field microscopy contains at least the following components: a light source for emitting excitation light, an illumination beam path for guiding the excitation light onto or into a sample, a two-dimensionally spatially resolving detector for detecting the light emitted by the sample, a detection beam path at least having a microscope objective and a multi-lens array for imaging light emitted by the sample onto the detector, and a control and evaluation unit for controlling the light source and the detector and for evaluating the measured data obtained from the detector. The control and evaluation unit is configured to control the light source and the detector to record at least one image data record of the sample.

Processes in organs, tissues and organisms are increasingly being examined in biomedical research. Light field microscopy (LFM) is increasingly used for recording images quickly. An advantage of light field microscopy is that a volume of several ten to hundred sectional images/z-planes can be reconstructed from a single camera recording, which as a rule is implemented within fractions of seconds. The possible extent of the observed volume in the z-direction in this case depends significantly on the microscope objective used and, in particular, on the numerical aperture thereof.

Various embodiments are possible in light field microscopy. In what is known as spatial domain light field microscopy, a multi-lens array (MLA) is arranged in the detection beam path in a plane conjugate to the object plane. Then, detection is carried out using a camera sensor in the back focal plane of said multi-lens array, this back focal plane then being optically conjugate to the back focal plane (BFP) of the microscope objective.

A method more intuitive for microscopy is what is known as the Fourier light field microscopy, in which the multi-lens array (MLA) is arranged in a plane conjugate to the pupil plane of the objective. Detection is once again implemented in the back focal plane (BFP) of the multi-lens array. In this case, real image representations of the sample volume are captured as partial images within the recorded camera image, said real image representations however in each case belonging to different parallactic viewing directions onto the sample. On account of the parallax, an—imaginary—axial shift of an emitting fluorescence molecule in the spatial domain causes a lateral shift of the signal on the camera sensor which is dependent on the position of the respectively considered lens.

The present application makes use of the term point spread function. This is intended to mean the intensity distribution of the light into which a parallel beam of rays is converted by a lens, for example by a lens in the multi-lens array. This function is routinely abbreviated PSF.

Various algorithms are available for reconstructing the structural volume information from the raw data.

In a first algorithm, all partial image data from the camera image are initially separated to form an image stack, with each partial image of this stack corresponding to a viewing direction onto the sample. To calculate the image content of a certain axial sample plane, each partial image of this stack is now shifted by the parallactic shift expected for the chosen axial plane. Then, the stack created thus is summated to form an image of a z-plane. To obtain a three-dimensional image, which is also referred to as a 3-D stack, this method is then repeated for the further axial sample planes and a three-dimensional image is then assembled from images for the individual z-planes.

The disadvantage of this method, which is also referred to as a shift & sum (S&S) method, is that detail information may be significantly overlaid by background signal, especially in the case of densely occupied samples.

In a similar method, the partial images of the image stack are shifted in accordance with the parallactic shift expected for the respectively selected axial plane, in the same way as in the shift & sum method. Unlike in the shift & sum method, the images of the stack created thus are subsequently not summed for a z-plane; instead, they are multiplied. This method, referred to as shift & multiply method, also supplies good results for samples with relatively few emitters in the sample volume.

The three-dimensional images of the sample obtained by means of the shift & sum or shift & multiply method may optionally still be improved by virtue of performing a deconvolution with the total point spread function (PSF) of the multi-lens array. The total point spread function (PSF) of the multi-lens array is composed of the point spread functions of the individual lenses of the multi-lens array.

A further important class of methods for reconstructing a three-dimensional image of the sample emerges from the consideration of an imaging function which describes the effect of the imaging optical system (here: the light field microscope) and which converts the sought spatial (i.e., three-dimensional) distribution of radiation emitters into an image to be observed. The evaluation task now consists of finding the inverse function for this imaging function in order to obtain the sought spatial distribution of radiation emitters from observed image data. These methods include deconvolution methods in particular. In iterative deconvolution methods, for example using the Richardson-Lucy iteration scheme, the inverse imaging function is not determined directly; instead, the distribution of radiation emitters which fits best to the observed image data when the imaging function is applied is sought for iteratively.

A further method uses a joint deconvolution (jDCV) approach. This likewise requires knowledge of the imaging function, for example in the form of point spread function (PSF), for each micro-lens and the computation times are significantly longer than in the case of shift & sum methods, for instance. In return, a significantly higher contrast image is obtained.

Moreover, what are known as Wiener deconvolution methods can be used in the reconstruction methods in order to reduce the noise at high spatial frequencies.

An apparatus of the generic type and methods for image reconstruction are described in Vol. 27, No. 18/2 Sep. 2019/Optics Express 25573.

A difficulty that may be encountered in methods for reconstructing the three-dimensional images from a measured image data record is that artefacts may arise in the reconstructed objects under certain sample conditions.

By way of example, a background signal with low spatial frequencies, in particular a homogeneous background signal, may be problematic. By way of example, such a background signal may come from the sample itself, for example in the form of autofluorescence light of the tissue and/or autofluorescence light of an embedding medium, in which the sample to be examined is embedded. Additionally, certain measurement structures may also tend to supply high background signals.

Furthermore, strong brightness gradients in the image data may present the reconstruction method with difficulties. Structures which cannot be detected unambiguously by way of the light field arrangement used can thereupon lead to the reconstruction methods delivering artefacts. Examples of this are, in particular, ambiguities in the image data which result from certain spatial frequency ranges missing from the optical transfer function of the light field arrangement. For example, situations may arise in which the image data for a hollow sphere cannot be distinguished from those obtained for a solid sphere.

Moreover, sample structures situated outside of a reconstructed volume may lead to artefacts, for instance by stray light which is radiated on the region of the reconstructed volume by such structures located on the outside.

It is clear that situations in which several of the specified conditions are present are also problematic.

In particular, undershoots and overshoots at steep intensity edges in the x-, y- and z-direction are observed as artefacts. Such phenomena are also referred to as "ringing". Bright structures in the focused regions are subsequently also found to be split. Finally, artefacts are observed that emerge from structures of the imaged object which in actual fact are located outside of the possibly restricted reconstructed volume in the object.

SUMMARY OF THE INVENTION

The object of the invention can be considered that of specifying a method and an apparatus for light field microscopy, by means of which the reconstruction of a three-dimensional object, which represents the respective examined sample, is improved.

This object is achieved by means of the method having the features of claim 1 and by means of the apparatus having the features of claim 31.

The following method steps are performed in the method according to the invention for light field microscopy:
 a) measuring an image data record of a sample using a light field arrangement;
 b) creating at least one partial data record from the image data record;
 c) reconstructing a three-dimensional object from the partial data record created in step b).

According to the invention, the apparatus for light field microscopy having the aforementioned features is developed by virtue of the control and evaluation unit also being configured to perform the method according to the invention.

The apparatus according to the invention for light field microscopy is consequently suited and configured to perform the method according to the invention.

Preferred variants of the method according to the invention are explained below, especially in the context of the dependent claims and the figures.

The general goal of light field microscopy is to reconstruct a three-dimensional image of the examined sample from an image data record obtained by means of a camera. In the present description and in the claims, the reconstructed three-dimensional images are referred to as objects in general and as three-dimensional objects in particular, in order to conceptually distinguish these from the image data obtained by the camera. If a reconstructed object represents only a part of the examined sample or only a part of those regions of the examined sample that are of interest, then it may also be referred to as a partial object. A reconstructed object, which may be considered the final result of the reconstruction method and consequently a representation of the examined sample, is also referred to as a sample object or, if composed from a plurality of partial objects, as an overall object as well.

The fact that, to avoid artefacts in the reconstruction, it is advantageous not to supply the image data as obtained by the measurement directly to the reconstruction but instead create, split off or separate at least one partial data record from an obtained image data record and then reconstruct an object for said partial data record can be considered to be a first essential insight of the invention.

For example, the reconstructed object can be a partial object. A final three-dimensional object which represents the sample to be examined can be created using the three-dimensional object reconstructed in step c). This final three-dimensional object can be referred to as sample object, final sample object or overall object.

The three-dimensional object reconstructed in step c) may also already be considered or classified as a representation of the examined sample, which is to say a final result of the reconstruction and consequently a final sample object.

The term partial data record is intended to be understood as meaning all subsets of an image data record, or else data records that have emerged from the image data record or parts thereof by processing, for example filtering.

In particular, the partial data record can be created from the image data record with the proviso of reducing artefacts during the reconstruction of a final three-dimensional object which represents the examined sample.

Artefacts can be reduced significantly by the method according to the invention. Moreover, the available computer resources can be used more effectively for the reconstruction of the sample objects.

The excitation light is electromagnetic radiation, in particular in the visible spectral range and adjoining ranges. The only demand placed on the contrast-providing principle by the present invention is that the sample emits emission light as a consequence of the irradiation by the excitation light and/or deflects, scatters or reflects back the excitation light. Typically, the emission light is fluorescence light which the sample, in particular dye molecules present there, emits or emit as a consequence of the irradiation by the excitation light.

At least one light source, for example a laser, may be present for providing the excitation light. The spectral composition of the excitation light can be adjustable, in particular between two or more colours. The excitation light can also simultaneously be polychromatic, for example if different dyes are intended to be detected simultaneously.

The term "illumination beam path" denotes all optical beam-guiding and beam-modifying components, for example lenses, mirrors, prisms, gratings, filters, stops, beam splitters, modulators, for example spatial light modulators (SLM), by means of which and via which the excitation light from the light source is guided to the sample to be examined.

The sample can be illuminated via an optical unit, in particular a microscope objective, which is not part of the detection beam path.

Alternatively, the sample may be illuminated via the same microscope objective which is also a part of the detection beam path.

Light that is emitted and/or deflected, for example scattered, by the sample to be examined as a consequence of the irradiation by the excitation light is referred to as emission light and reaches the camera via the detection beam path. The term "detection beam path" denotes all beam-guiding and beam-modifying optical components, for example objectives, lenses, mirrors, prisms, gratings, filters, stops, beam splitters, modulators, for example spatial light modulators (SLM), by means of which and via which the emission light is guided from the sample to be examined to the detector.

The detector is a sufficiently fast optical detector comprising a two-dimensionally spatially resolving sensor area. In particular, the detector can be a camera, especially with a CCD, CMOS, sCMOS or SPAD camera chip.

The multi-lens array serves to image light emitted by a sample onto the detector. In this case, it is preferable for the detector to be arranged in a focal plane of the lenses of the multi-lens array or in any case in the vicinity of this focal plane. However, this is not mandatory for the implementation of the present invention. Imaging within this sense may also be blurred. All that is necessary is that the multi-lens array is arranged in a defined and known relative position with respect to the two-dimensionally spatially resolving detector.

The term "control unit" denotes all hardware and software components which interact with the components of the microscope according to the invention for the intended functionality of the latter. In particular, the control unit can have a computing device, for example a PC, and a camera controller capable of rapidly reading out measurement signals.

The computer resources of the control and evaluation unit can be distributed among a plurality of computers and optionally a computer network, in particular also via the Internet. The control and evaluation unit can have in particular customary operating devices and peripherals, such as mouse, keyboard, screen, storage media, joystick, Internet connection. The control and evaluation unit can read in the image data from the detector, in particular.

The reconstruction of the three-dimensional objects from a recorded image of the examined sample using parameters of the light field arrangement, such as numerical aperture of the microscope objective or optical parameters of the multi-lens array, is implemented by the control and evaluation unit.

No particular demand is placed on the microscope objective. In particular, it can be an immersion objective.

The method according to the invention and the apparatus according to the invention are suitable in principle for any type of samples which are accessible to examination by light field microscopy.

The images recorded by the light field microscope in each case comprise a set of partial images. The partial images are those images that are created on the two-dimensionally spatially resolving detector by a single lens of the multi-lens array. The number of partial images thus corresponds to the number of utilized lenses of the multi-lens array. For example, the multi-lens array may comprise 37 or 89 lenses.

The image data obtained by the detector during a measurement may be regarded as a number of partial images and may be evaluated as such, with said number corresponding to the number of utilized lenses of the multi-lens array. However, the entire image measured by the detector, which may be referred to as overall image, may also be regarded as a single image with a corresponding number of image regions. The evaluation of the image information and reconstruction of the volume structure of the sample can be implemented on the basis of some or all partial images or on the basis of the overall image. It is also possible that only portions of all partial images or else only some partial images are considered for the evaluation.

The light field microscopy can be performed as fluorescence microscopy and light sources, especially lasers, suitable for the fluorescence excitation of the dyes used to prepare the samples to be examined are preferably used as light sources.

In a particularly advantageous embodiment of the apparatus according to the invention, the multi-lens array is arranged in a plane (pupil plane) optically conjugate to the back focal plane of the microscope objective. The partial images belonging to the individual lenses then correspond to images of the sample from different parallactic angles. In this variant referred to as Fourier light field microscopy, the partial images are clearly understandable. However, the present invention is not restricted to Fourier light field microscopy. Rather, the variant referred to as spatial domain light field microscopy can be used for the method according to the invention and the apparatus according to the invention, within the scope of which the multi-lens array is arranged in a plane (intermediate image plane) optically conjugate to a plane of the sample.

Moreover, arrangements and method variants in which the multi-lens array is situated neither in an intermediate image plane nor in a pupil plane are also possible. The image data obtained using such arrangements fundamentally contains the same information as in the case of spatial domain light field microscopy and Fourier light field microscopy. The methods for reconstructing a three-dimensional image of the sample must then be adapted using the respectively applicable geometric parameters of the imaging system, in particular the relative position of the multi-lens array with respect to an intermediate image plane and/or a pupil plane.

In detail, whether and to what extent artefacts can be avoided in the reconstruction specifically depends on the methods used to create the partial data record. In principle, the partial data record created in step b) can be created such that it essentially contains wanted components in view of the sample regions of interest. A reconstruction of such a partial data record would then supply an object which is already comparatively similar to a final sample object or may optionally even already be assessed as a final sample object. However, it is also possible to initially create the partial data record in such a way that it contains substantially unwanted components in view of the sample regions of interest. The path of reconstructing a final sample object then requires further method steps in addition to the reconstruction of such a partial data record. Finally, it is also possible to generate a partial data record in step b) such that it contains both wanted and unwanted components in view of the sample regions of interest, optionally to the same or similar extent.

In preferred variants of the method according to the invention, the at least one partial data record is created by decomposing the image data record into a plurality of partial data records. The image data record being decomposed into exactly two partial data records was found to possibly already be sufficient in practice.

By way of example, the measured image data record can be representable by a sum of partial data records or any other combination thereof.

If data are separated from the measured image data record, be it in the spatial domain, for example if data are subtracted from the image data record, or in the domain of spatial frequencies, for example within the scope of filtering, then the remaining partial image data record may be referred to as residual image data record.

The ringing artefacts arise, in particular, if the sample has an underground or background which for example is constant. Within the scope of the work that has led to the present invention, it was possible to show that the reconstruction result, and consequently the reconstructed objects, have significantly fewer ringing artefacts if the background is separated from the overall signal in the measured image data record before a reconstruction method is applied. By way of example, the image data record or a residual image data record may be filtered to separate off the background signal. In this context, filtering should be understood as a manipulation of the spectrum of the spatial frequencies of the image data record, which is to say an image data record or residual image data record is manipulated in the domain of spatial frequencies. Other methods are possible; in particular, the data may also be manipulated directly in the spatial domain.

By way of example, a partial data record can be created by virtue of at least one of the following methods being applied to the measured image data record or a residual image data record:
- high-pass filtering;
- low-pass filtering;
- bandpass filtering;
- rolling ball algorithm;
- filtering using a wavelet filter;
- an algorithm for determining the constant or locally fluctuating background signal in the spatial domain.

By way of example, the image data record or a residual image data record can be decomposed into at least two, optionally partially overlapping frequency bands of the spatial frequencies. Decomposing the image data record into two frequency bands was found to possibly already be sufficient in practice.

As an alternative or in addition, an offset function can be subtracted from the image data record or a residual image data record for the purpose of creating a partial data record. This method is also particularly suitable for removing a background.

The offset function may in particular have values that vary with location in the image, which is to say a different offset can be subtracted depending on the x- and y-coordinate.

By way of example, the offset function may have in each case a constant value for at least two partial images, in particular for a plurality or all of the partial images of the measured image data record or of a residual image data record. The value of the offset can be determined by an image evaluation, especially on an individual basis for each of the partial images.

In principle, it must be kept in mind that measurement information originating from the sample is also lost with every instance of filtering and/or subtracting an offset. This may be undesirable, depending on the nature of the examined sample.

Given different sample conditions, the various algorithms for reconstructing three-dimensional objects are each susceptible in different ways to certain image artefacts in the reconstructed objects. For example, it was found that samples with a homogeneous background create more artefacts than samples without a background signal. Then again, relatively few artefacts are developed in the case of image data with comparatively little contrast, and this is substantially independent of the level of a background signal.

Therefore, it may be advantageous to decompose the measured image data record into a plurality of partial data records which each have a different image contrast.

In general, what is important is that all of the methods described here for the creation of partial data records and for the decomposition of a measured image data record into a plurality of partial data records can be combined with one another and, where advantageous, can be performed in parallel or sequentially.

In principle, it may already be sufficient for a three-dimensional object to be reconstructed from a single partial data record, said object then being assessed as final sample object. In a variant of the method according to the invention, a respective three-dimensional partial object is therefore reconstructed from at least one partial data record and in particular from all partial data records.

A three-dimensional overall object, in particular a final sample object representing the examined sample, may be obtained by virtue of combining at least two partial objects which were reconstructed from two different partial data records created from the measured image data record. Less information with respect to the sample is lost in the process, and artefacts, for example ringing artefacts, can equally be reduced.

In principle, a partial object can be reconstructed from each of the partial data records using the same reconstruction method. However, it may be advantageous to select the respectively used reconstruction method on the basis of the respective partial data record. Preferred variants of the method according to the invention are therefore distinguished in that the reconstruction of at least two partial data records, in particular of all partial data records, is performed using a different reconstruction method in each case or using the same reconstruction method but different parameters, for example different spatial resolutions.

In further preferred configurations of the method according to the invention, respective three-dimensional partial objects are reconstructed sequentially or in parallel from at least two partial data records or from all partial data records.

In a particularly preferred variant of the method according to the invention, a spatial resolution used to perform a reconstruction for a certain partial data record is increased with higher spatial frequencies contained in the respective partial data record. The spatial resolution is also referred to as sampling. A spatial resolution chosen to be lower is also accompanied by less computational outlay.

At least one of the following methods can be applied in order to reconstruct a three-dimensional object from a partial data record:
- shift & sum method;
- shift & multiply method;
- Wiener deconvolution or Lucy-Richardson deconvolution in combination with shift & sum or shift & multiply methods;
- Lucy-Richardson deconvolution;
- joint or multi-view Lucy-Richardson deconvolution;
- single value decomposition method, in particular in combination with a regularization (e.g., inverse filtering with a Tikhonov regularization);
- deconvolution with point spread functions possibly containing stray light components in particular.

Methods using artificial intelligence and neural networks may also be used.

All of the variants, described here, for reconstructing three-dimensional objects from partial data records may be combined with one another.

The combination of three-dimensional partial objects to form a three-dimensional overall object can be brought about, in particular, by a superimposition of at least two three-dimensional partial objects, which each emerge from different partial data records of the image data record by reconstruction.

By way of example, at least one of the following methods can be performed for the purpose of superimposing the partial objects to form the overall object:
  addition of the partial objects in the spatial domain;
  weighted addition of the partial objects in the spatial domain;
  multiplication of the partial objects in the spatial domain;
  weighted multiplication of the partial objects in the spatial domain;
  addition of the partial objects in the spatial frequency domain;
  weighted addition of the partial objects in the spatial frequency domain.

An addition of partial object in the spatial frequency domain corresponds to a superimposition or overlay of frequency bands. What was found in practice is that good results can already be achieved using two frequency bands. The frequency bands may overlap, in particular in parts. The addition of partial objects may be a weighted addition, in the case of which the individual summands are respectively weighted with an individual weight factor. These factors can be chosen so that their sum equals 1.

An important circumstance with regards to the creation of a partial data record from a measured image data record or the decomposition thereof into a plurality of partial data records is that the partial data records may be inconsistent to the extent that there is no real three-dimensional object for which a light field imaging step supplies the relevant partial data record.

In a further group of advantageous embodiment variants of the method according to the invention, effects of such inconsistencies are reduced by virtue of the partial data records each being created while consistency is maintained. In particular, it is also possible in that case to assemble or combine an overall object from partial objects which were reconstructed from consistent partial data records in each case. Artefacts can be significantly reduced in this way.

The following method steps can preferably be performed: a partial object is reconstructed from a partial data record in step c), a light field image data record is simulated for this partial object, the simulated light field image data record is compared with the partial data record, and subsequently at least one of the following steps is performed:
  storing a result of the comparison;
  outputting and/or displaying the result of the comparison to a user;
  depending on the result of the comparison, creating a recommendation for a user in respect of further steps for the reconstruction of an object;
  changing the creation of the partial data record in step b).

Possible inconsistencies of the partial data record lead to the simulated light field image data record not completely corresponding to the partial data record from which the simulated light field image data record emerges. Differences between the original partial data record and the simulated light field image data record are determined during the comparison and can be used as a measure for the consistency or inconsistency of the respective partial data record.

Since the optical transfer functions, in particular the point spread functions of the microscope objective and of the lenses of the multi-lens array, are well known, simulating the light field image data record is possible with very high accuracy. What is important is that the light field image data record which emerges from such a simulation is consistent if the object for which the simulation is performed is possible at least in theory. However, it is not detrimental to the consistency of the simulated data record if the object may be possible in theory, but is not plausible as such, for example because it has structures that do not occur in nature.

In principle, known methods can be used for the comparison, for example image correlation or sum of the squared deviations. The recommendations to a user may in particular relate to propositions regarding changes of method variants or method parameters in view of the reconstruction of a partial object and in particular in view of the reconstruction of a final sample object. In particular, the recommendations may relate to the creation of the partial data record in step b), with the result that improvements are achieved in view of the reconstruction of a partial object and in particular the reconstruction of a final sample object.

In a further preferred exemplary embodiment of the method according to the invention, the following steps of
  creating a partial data record;
  reconstructing an object from the created partial data record;
  simulating a light field image data record from the reconstructed object;
    comparing the simulated light field image data record with the partial data record;
    changing the creation of the partial data record in step b)
      are performed multiple times in succession until a resultant partial data record has been obtained, for which the comparison with the simulated light field image data record supplies a sufficiently good correspondence.

Then, an object can be reconstructed for the resultant partial data record determined thus and/or for the partial data record corresponding to the original image data record minus the resultant partial data record.

Artefacts can already be reduced significantly if the partial data records to be reconstructed are suitably created or the methods to be applied for the creation of the partial data records are suitably chosen. However, it is also possible to examine partial data records and/or reconstructed objects in a targeted manner in view of artefacts. Information obtained in the process can be used, firstly, to modify the creation of the respective partial data record. Partial data records and/or reconstructed objects may however also be changed or corrected in a targeted manner. In an advantageous variant of the method according to the invention, the following method steps, for example, are performed: object regions indicating reconstruction artefacts are searched for in a three-dimensional object which is reconstructed from a partial data record, and at least one of the following steps is subsequently carried out:
  storing found object regions;
  outputting and/or displaying the found object regions to a user;
  depending on the found object regions, creating and outputting and/or displaying a recommendation to a user in respect of further steps for the reconstruction of an object or final sample object;

correcting the found object regions indicating reconstruction artefacts.

A user can correct the object manually on the basis of output or displayed object regions. The output and/or display of the found object regions may also provide relevant information to the user, on the basis of which the user can change method parameters for the purpose of creating the partial data records and/or reconstructing the latter, in order to ultimately improve the reconstruction of a final sample object. Likewise, the recommendations to the user may relate to the following: corrections in the found object regions, changes of parameters in the methods for creating the partial data records and/or methods for the reconstruction thereof, all in view of improving the reconstruction of a final sample object. It is also possible that such changes of method parameters and/or corrections of the object are implemented automatically.

For example, those pixels of the object whose picture values are outside of value intervals to be defined can be assessed as object regions indicating artefacts. By way of example, it is possible that pixels of the object whose picture values are less than zero or greater than a threshold value are assessed as object regions which indicate artefacts.

For example, a corrected object can be created by virtue of pixels in the three-dimensional object whose picture values are outside of value intervals to be defined, in particular pixels with negative picture values, being set to values to be defined, in particular to zero. This can be performed automatically or manually by a user, and optionally only for a few of the found object regions.

In order to reduce implausible structures, for example particularly sharp edges, in an object, optionally in a corrected object, it may likewise be advantageous to apply further algorithms to the relevant object for the further correction thereof. By way of example, a soft-focus function may be applied.

In further preferred configurations of the method according to the invention, the following method steps may be performed: Initially, a partial data record is created from a measured image data record, with this being able to be performed as a matter of principle by using any of the methods described herein. A three-dimensional object is reconstructed from the created partial data record. Corrections can optionally be implemented on this object, as described above. A light field image data record is subsequently simulated for the three-dimensional object, in particular for the corrected three-dimensional object. This light field image data record is always consistent for the reasons described above. A difference data record is subsequently calculated by forming the difference between the measured image data record and the simulated light field image data record. Because light field imaging is a linear map and because the simulated light field image data record is consistent, the difference data record will also be consistent if the originally measured image data record is consistent.

It is preferably possible once again to search in the difference data record for image regions that indicate reconstruction artefacts, and at least one of the following steps can subsequently be carried out:

storing found image regions;

outputting and/or displaying the found image regions to a user;

depending on the found image regions, creating and outputting and/or displaying a recommendation to a user in respect of further steps for the reconstruction of an object, in particular a final sample object;

correcting the found image regions indicating reconstruction artefacts.

A user can correct the difference data record manually on the basis of output or displayed regions of the difference data record. The output and/or display of found regions of the difference data record may also provide relevant information to the user, on the basis of which it is possible to change method parameters for the purpose of creating the partial data records and/or reconstructing the latter, in order to ultimately improve the reconstruction of a final sample object. Likewise, the recommendations to the user may relate to the following: possible corrections in the found regions of the difference data record, changing parameters of the methods for creating the partial data records and/or the methods for the reconstruction thereof, all in view of improving the reconstruction of a final sample object. It is also possible that such changes of method parameters and/or corrections of the difference data record are implemented automatically.

Those pixels of the difference data record whose picture values are outside of value intervals to be defined, which for example are greater than a threshold value or less than zero, are assessed as image regions indicating artefacts.

For example, a corrected difference data record can be created by virtue of pixels whose picture values are outside of value intervals to be defined, in particular pixels with negative picture values, being manually or automatically set to values to be defined, in particular to zero, in the difference data record.

In order to reduce implausible structures, for example particularly sharp edges, in a difference data record, optionally in a corrected difference data record, it may likewise be advantageous here to apply further algorithms to the relevant difference data record for the further correction thereof, in a manner comparable to the correction of a reconstructed object. By way of example, a soft-focus function can be applied to the difference data record.

A partial object which may be referred to as residual partial object can then be reconstructed from the difference data record, optionally from the corrected difference data record. This residual partial object represents the residual components of the original image data record which were not split off during the original creation of the partial data record. In principle, any of the reconstruction methods described here can be used for the reconstruction of the partial object from the difference data record.

Method variants in which a single partial data record is created or split from the measured image data record, a partial object is subsequently reconstructed from this partial data record and a further partial object representing the residual image information is subsequently reconstructed from the residual image data record were described above. However, it is also possible to create a plurality of partial data records from the outset, with the respective methods for creating the partial data records being able to be applied both to the originally measured image data record and to the respective remaining residual image data records.

To avoid artefacts when a light field image data record obtained from a simulation should be subtracted from the originally measured image data record or from a residual image data record following the reconstruction of a partial object, it was found to be expedient if partial objects are initially reconstructed from partial data records containing lower spatial frequencies, and if subsequently partial objects are successively reconstructed from partial data records containing increasingly higher spatial frequencies. It was found that the subtraction of high-frequency image information from the measured image data record can easily create artefacts to the extent that an artificial hole structure arises on the low frequency background as a result of the subtraction.

The reconstruction of three-dimensional objects from the light field image data is computationally intensive. The required computation time depends, in particular, on the chosen size of the volume to be reconstructed. If the volume to be reconstructed is chosen to be smaller in the direction of the optical axis than the actually imaged object, then artefacts which result from real structures outside of the reconstructed volume may arise during the reconstruction in the reconstructed volume, which may also be referred to as target region.

Such artefacts can be reduced in the following variant of the method according to the invention, in which the following method steps are performed:
  reconstructing an object from the image data record or a partial data record with a reduced spatial resolution, created from the image data record, for a volume containing regions of the sample of interest;
  creating a reduced partial object by setting the picture values of the object to a value to be defined, in particular to zero, for all pixels in a target region in which the regions of the sample of interest are situated;
  simulating a light field image data record for the reduced partial object;
  creating a different data record by forming the difference between the originally measured image data record and the light field image data record simulated for the reduced partial object;
  reconstructing a partial object from the difference data record.

The target region can be determined by evaluating the partial object reconstructed with reduced spatial resolution. This can be implemented visually by a user, or else in fully or partly automated fashion.

Effects of defocussed object structures are also acquired in this method variant on account of the object initially being reconstructed for a comparatively large volume. Taken by itself, the comparatively large volume to be reconstructed leads to a significantly increased computation time. However, this is counteracted in this method variant by virtue of the large volume being reconstructed with a reduced spatial resolution. The computation time can thus be reduced. To this end, the partial data record used in the first method step to reconstruct an object from the measured image data is advantageously created by removing the background signal from the image data record, in particular by applying a low-pass filter or a rolling ball algorithm to the measured image data record. Further, the spatial resolution of the partial data record, which is also referred to as pixel sampling, can be reduced. For example, the data record can be reduced by a factor of 4 in each of the coordinates x and y, and hence be reduced overall by a factor of 16.

The reduced partial object only still contains defocussed structures outside of the target region.

The spatial resolution of the reduced partial object and/or of the pixel sampling of the light field image data record simulated for the reduced object can then be increased again and as described above an object, now with an increased spatial resolution for the volume of the target region, can be calculated for the difference data record.

Since the spatial resolution reduces away from the focus in light field microscopy, the reconstruction of defocussed object structures can be implemented with a significantly reduced spatial resolution, which is to say significantly reduced sampling. If an iterative deconvolution method is used for the reconstruction, for example a Richardson-Lucy method, work during the reconstruction of the large-volume object can be carried out with comparatively few iteration steps. As a result of the reduced spatial resolution (reduced sampling) and/or the reduced number of iterations, the reconstruction of the large-volume object equally requires comparatively little computation time.

The fact that the difference data record, as described above, is a consistent data record is also advantageous in this method variant. There can be an optional correction of the object reconstructed in the first method step, as described above. In addition and/or as an alternative, the difference data record can be corrected before a sample object is reconstructed therefrom.

In this method, the target region, which is to say the region containing the sample structures of interest, is cut out of the measured image data record in a manner that maintains the consistency of the partial data records.

BRIEF DESCRIPTION OF THE DRAWINGS

Further advantages and features of the present invention are discussed below with reference to the attached figures, in which.

DETAILED DESCRIPTION OF THE INVENTION

Figure 1:
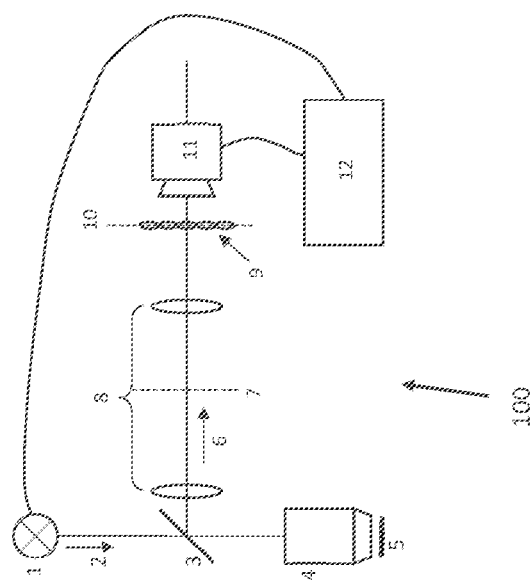
FIG. 1: shows a schematic overview of an apparatus according to the invention for light field microscopy.

An example of an apparatus according to the invention for light field microscopy 100, which is suitable and configured for performing the method according to the invention is explained with reference to FIG. 1. The apparatus 100 shown therein contains the following as essential components: a light source 1, typically one or more lasers, for emitting excitation light 2, an illumination beam path with a microscope objective 4 for guiding the excitation light 2 onto or into a sample 5, a two-dimensionally spatially resolving detector 11 for detecting light 6 emitted by the sample 5, and a detection beam path with the microscope objective 4 and a multi-lens array 9 for guiding the light 6 emitted by the sample 5 onto the detector 11. The detector 11 is arranged in or in the vicinity of a focal plane of the multi-lens array 9 and can typically be a sCMOS, CMOS, CCD or SPAD camera. The multi-lens array 9 could also be part of the objective 4 and be arranged in the back focal plane thereof.

Finally, a control and evaluation unit 12, which may in particular be a computer of the type known per se, is present for the purposes of controlling the light source 1 and the detector 11 and for the purposes of evaluating the measurement data obtained from the detector 11.

In principle, the control and evaluation unit can be realized by a single computer. However, it is also possible that the control and evaluation unit comprises a plurality of computers, on which respective different tasks, in particular reconstruction methods, are performed, for example if neural networks are used in the reconstruction methods for the evaluation and processing of the image data record. In this respect, the designation of a control and evaluation unit can also comprise functional units which are arranged at different locations and, if appropriate, are far away from one another and connected to one another via the cloud. For interaction with a user, the control and evaluation unit 12 can have fundamentally known functional components, such as mouse, joystick, keyboard, screen, loudspeaker, camera, Internet connection.

The light 2 emitted by the light source 1, in particular excitation light for fluorescent dyes used to prepare the sample 5, reaches the microscope objective 4 through a dichroic beam splitter 3 and is focused into a sample plane on or in the sample 5 by means of said microscope objective. Emission light emitted by the sample 5, in particular fluorescence light emitted by fluorescent dyes, returns to the dichroic beam splitter 3 via the microscope objective 4 and is reflected at said dichroic beam splitter in the direction of a relay optical unit 8. The relay optical unit 8 consists of at least two lenses arranged like a telescope with respect to one another. An intermediate image plane, which is to say a plane optically conjugate to the sample plane, is situated at the position 7. After passing through the relay optical unit 8, the emission light reaches a multi-lens array 9, which is arranged in a plane optically conjugate to the back focal plane of the microscope objective 4 (objective pupil BFP). The individual lenses of the multi-lens array 9 generate partial images on the detector 11 arranged in a focal plane of the multi-lens array 9, said partial images respectively being individual images of the sample 5 from different angles, more precisely: different parallax angles. An image data set recorded by the apparatus 100 for light field microscopy thus in each case comprises a set of partial images.

The arrangement with the multi-lens array 9 arranged in a pupil plane, shown in FIG. 1, is a set-up for Fourier light field microscopy. Alternatively, what is known as spatial domain light field microscopy would also be possible for implementing the invention, within the scope of which a multi-lens array is arranged in a plane in the detection beam path optically conjugate to the object plane (rather than the back focal plane of the microscope objective 4). The raw image information obtained by the spatial domain light field microscopy is related to that obtained by Fourier light sheet microscopy by way of a Fourier transform. Ultimately, the result of both methods is in principle the same, however. Intermediate forms are possible, too, in which the multi-lens array is situated somewhere between an intermediate image plane and a pupil plane.

In real embodiments, the apparatus 100 according to the invention can comprise numerous further optical components, in particular mirrors, lenses, colour filters and stops, the function of which is known per se and which are therefore not specifically described in the present description. Furthermore, controllable components which influence the wavefronts of the propagated light can be present, for example spatial light modulators and/or deformable mirrors. These components are likewise not illustrated in FIG. 1.

According to the invention, the control and evaluation unit 12 is configured to control the light source 1 and the detector 11 in order to record at least one image data record of the sample 5 and to perform the method according to any of claims 1 to 30.

Figure 2:
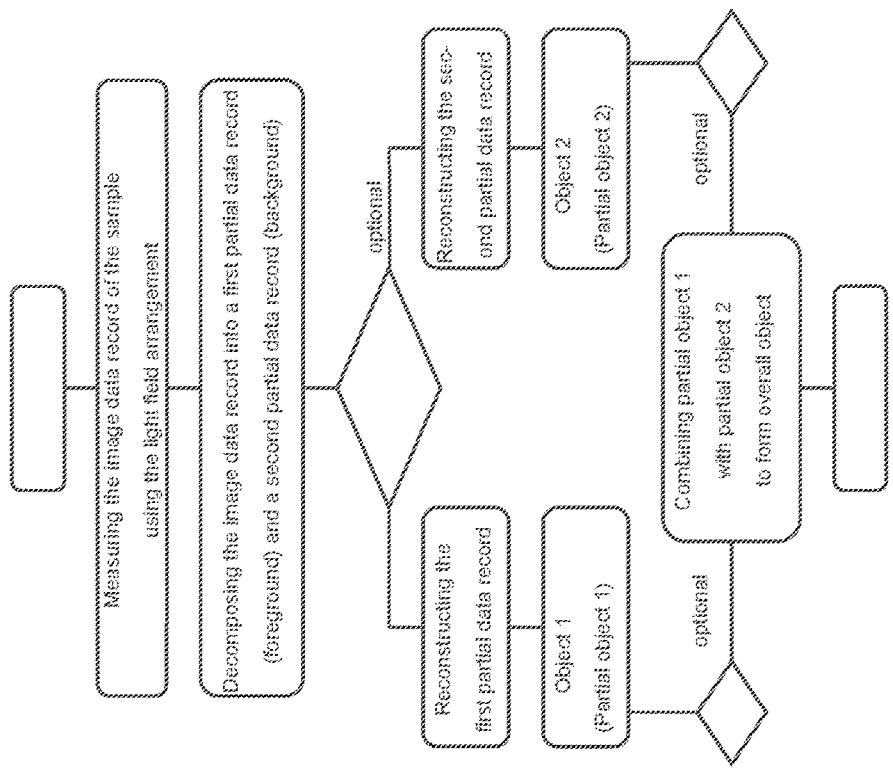
FIG. 2: shows a flowchart of a first exemplary embodiment of the method according to the invention and of variants thereof.

In the variant illustrated in the flowchart of FIG. 2, an image data record of a sample is recorded using a light field arrangement, for example of the type shown in FIG. 1, in the first method step. This image data record is subsequently decomposed in the second method step into a first partial data record, which essentially contains image information of the sample (foreground), and a second partial data record, which substantially contains a background signal. Then, an object 1 is reconstructed from the first partial data record. The object 1 can optionally be evaluated and may already be considered to be a final sample object.

Optionally, a second object 2 may also be reconstructed from the second partial data record, which essentially contains background signal. The object 1 and the object 2 may also be referred to as partial object 1 and partial object 2. Likewise optionally, the partial object 1 and the partial object 2 can be combined or superimposed to form an overall object which represents the examined sample.

Figure 3:
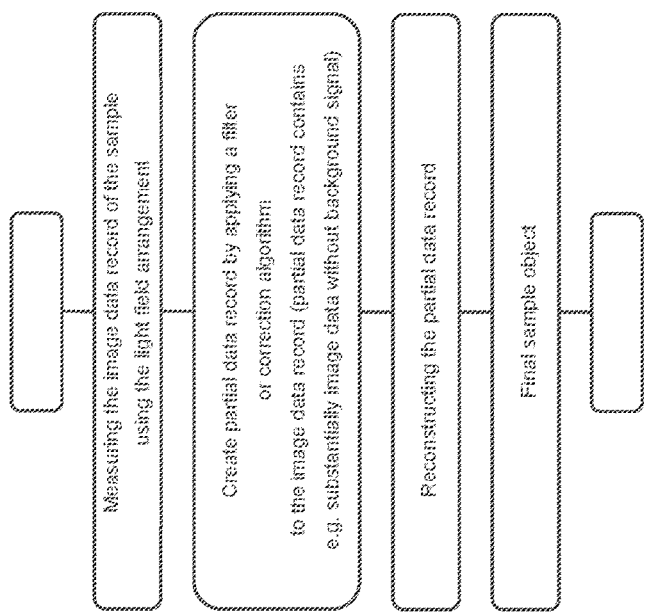
FIG. 3: shows a flowchart of a second exemplary embodiment of the method according to the invention.

The variant shown in FIG. 3 differs from that of FIG. 2 inasmuch as there is a specific statement to the fact that the partial data record from the image data record measured in the first method step arises from the application of a filter or a correction algorithm, with the result that the partial data record essentially contains image data without a background signal. By way of example, the filter can be a low-pass filter.

Figure 4:
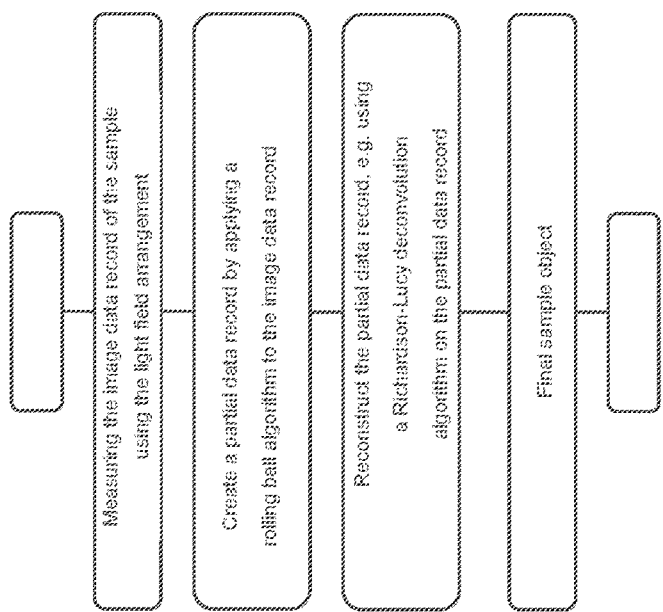
FIG. 4: shows a flowchart of a third exemplary embodiment of the method according to the invention.

In the variant illustrated in FIG. 4, the partial data record is created by the application of a rolling ball algorithm to the image data record measured in the first method step. The effect of a rolling ball algorithm is similar to that of a low-pass filter, which is to say low-frequency components are removed from the image data, but the rolling ball filter acts locally on the image data and globally like the low-pass filter. Then, from the partial data record obtained, a final sample object is reconstructed using a Richardson-Lucy deconvolution algorithm in this variant. Other reconstruction methods can also be used.

Figure 5:
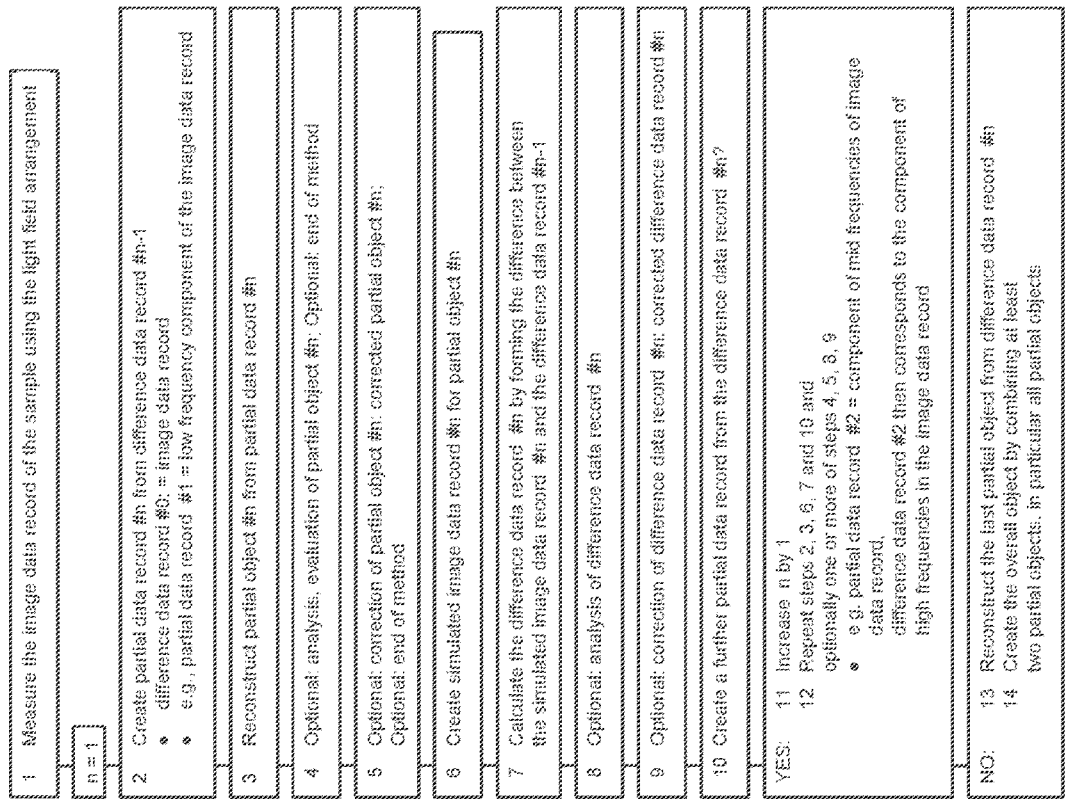
FIG. 5: shows a flowchart of a fourth exemplary embodiment of the method according to the invention.

A further preferred variant of the method according to the invention is finally described with reference to the diagram in FIG. 5. The sign # is to be read and understood as "number" in each case.

The method starts in step 1 by measuring an image data record of a sample using a light field arrangement, for example of the type shown in FIG. 1, in accordance with method step a) in claim 1.

As described below, method steps 2, 3, 6, 7 and 10 and optionally one, more or all of steps 4, 5, 8, 9 can be run through multiple times in a cycle in the method illustrated in FIG. 5. Therefore, a counter n is set to 1 at the start, following method step 1.

It is also important that difference data records are formed in the variant of the method according to the invention illustrated in FIG. 5, in a manner yet to be described below. In the terminology used here, the originally recorded image data record is the difference data record #0. A partial data record #1 is created in method step 2 from the original image data record, which is to say the difference data record #0. For example, a low-frequency component can be split off the difference data record #0, which is to say from the originally measured image data record, as partial data record #1, for example by applying a low-pass filter.

In step 3 (corresponding to method step c) in claim 1), a partial object #1 is reconstructed from the partial data record #1.

In optional method step 4, this partial object #1 can be evaluated and/or analysed. Optionally, the method can already be terminated after this step and the partial object #1 can be output as final sample object.

However, the evaluation of partial object #1 can also be followed by a correction of the partial object #1 (optional method step 5). For example, the pixels of the partial object

1 which have negative values typically on account of artefacts of the reconstruction in method step 3 can be set to 0. A partial object #1 is obtained as a result of optional method step 5. The method can optionally also be terminated after step 5 and the corrected partial object #1 can be output as final sample object. The correction can be implemented automatically or interactively by a user.

Then, a simulated image data record #1 is created in method step 6 from the partial object #1 or the corrected partial object #1.

Then, a difference data record #1 is created in method step 7 by forming the difference between the original image data record, which is to say the difference data record #0, and the simulated image data record #1.

This can be followed by an evaluation of the difference data record #1 (optional method step 8) and optionally also by a correction of the difference data record #1 (optional method step 9). For example, pixels where the difference data record #1 has negative values can be set to zero. Thus, a corrected difference data record #1 is obtained as the result of optional method step 9. In this case, too, the correction can be implemented automatically or interactively by a user.

The simulation of an image data record for an object always supplies a consistent image data record even if the object for which this image data record is simulated is implausible or not possible in reality. The difference data record will therefore also be a consistent image data record if the original image data record (=difference data record #0) is a consistent data record.

In the example where the partial data record #1 created in method step 2 is the low-frequency component of the original image data record, the difference data record #1 corresponds to a component of mid and high frequencies of the original image data record (=difference data record #0).

Then, a decision as to whether a further partial data record should be created from the difference data record #1 is made in method step 10.

If this decision is answered in the affirmative in method step 10, the counter n is initially increased by 1 in method step 11 and method steps 2, 3, 6, 7 and 10 and optionally one, more or all of steps 4, 5, 8, 9 are subsequently repeated (method step 12). For example, a component of mid frequencies in the difference data record #1 can be split off as partial data record #2 by the application of a filter during a second iteration (n=2) of method step 2. The difference data record #2 created in method step 7 during the second iteration then substantially corresponds to the component of high frequencies in the original image data record, which is to say in the difference data record #0.

The difference data records created in method step 7 with n greater than 0 respectively are residual image data records and partial data records within the meaning of the claims and the description above. The simulated image data records are simulated light field image data records within the meaning of the claims and the description above.

If the question in the method step 10 is answered in the negative, a last partial object, which in turn can optionally be analysed, evaluated and/or corrected, can be reconstructed in method step 13 from the difference data record #1.

Finally, an overall object is created by combination in method step 14 from at least two partial objects, in particular all previously reconstructed partial objects, and optionally from the corrected partial objects. For example, the partial objects can be superimposed in the frequency domain for the purpose of being combined to form the overall object.

If the low-pass filter used to split off the partial data record #1 is chosen so that it is essentially a background signal, which is to say low spatial frequencies (unwanted components), that is split off, then the overall object could for example be combined in method step 14 from the wanted components of the image data record, which is to say consequently from the high and mid spatial frequencies. Specifically, the final sample object would therefore be combined from the partial object #2, which was reconstructed from the partial data record #2 and which contains the mid spatial frequencies, and the last partial object, which was reconstructed from the difference data record #2 and which contains the high spatial frequencies.

The described procedure of initially splitting off partial data records containing the low spatial frequencies, reconstructing partial objects therefrom and successively splitting off the higher spatial frequencies is preferred. The reason is that artefacts arise comparatively frequently during the reverse procedure, which is to say when an image data record simulated for a partial object with high spatial frequencies is subtracted from a measured image data record.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS AND USED ABBREVIATIONS

1 Light source (laser)
2 Excitation light
3 Dichroic beam splitter
4 Microscope objective
5 Sample
6 Emission light
7 Intermediate image plane
8 Relay optical unit
9 Multi-lens array
10 Fourier plane (optically conjugate to the BFP of the microscope objective 4)
11 Detector (camera, in the image plane)
12 Control and evaluation unit
100 Apparatus for light field microscopy
BFP Back objective pupil (back focal plane)
LFM Light field microscope
LSM Laser scanning microscope
MLA Multi-lens array
PSF Point spread function

The invention claimed is:

1. Method for light field microscopy comprising:
a) measuring an image data record of a sample using a light field arrangement,
the light field arrangement comprising a multi-lens array and a two-dimensionally spatially resolving detector,
wherein the image data record is a set of partial images on the detector and wherein each of the partial images is created on the detector by a respective single lens of the multi-lens array,
b) creating at least one partial data record from the image data record, wherein the partial data recorded is a subset the image data record or a data record that has emerged from the image data record or parts thereof by processing, c) reconstructing a three-dimensional object from the partial data record created in step b).

2. Method according to claim 1, wherein the partial data record created in step b) contains either substantially wanted components or substantially unwanted components in view of sample regions of interest.

3. Method according to claim 1, wherein at least one partial data record is created by decomposing the image data record into a plurality of partial data records.

4. Method according to claim 1, wherein the measured image data record is representable by a sum of partial data records or any other combination thereof.

5. Method according to claim 1, wherein a partial data record is created by virtue of at least one of the following methods being applied to the measured image data record or a residual image data record:
high-pass filtering;
low-pass filtering;
bandpass filtering;
rolling ball algorithm;
filtering using a wavelet filter;
algorithm for determining the partly or completely homogenous background.

6. Method according to claim 1, wherein a partial data record is created by subtracting an offset function from the image data record or a residual image data record.

7. Method according to claim 6, Characterized in that the offset function has locally differing values.

8. Method according to any of claim 1, wherein the image data record is decomposed in at least two frequency bands of the spatial frequencies.

9. Method according claim 1, wherein the decomposition of the image data record into a plurality of partial data records is implemented with a different image contrast in each case.

10. Method according to claim 1, wherein a three-dimensional partial object is in each case reconstructed from at least two, and in particular from all, partial data records.

11. Method according to claim 1, wherein the reconstruction of at least two partial data records, in particular of all partial data records, is performed using a different reconstruction method in each case or using the same reconstruction method but different parameters.

12. Method according to claim 1, wherein respective three-dimensional partial objects are reconstructed sequentially or in parallel from at least two partial data records or from all partial data records.

13. Method according to claim 1, wherein a spatial resolution used to perform a reconstruction for a certain partial data record is increased with higher spatial frequencies contained in the respective partial data record.

14. Method according to claim 1, wherein partial objects are initially reconstructed from partial data records containing lower spatial frequencies, and in that subsequently partial objects are successively reconstructed from partial data records containing increasingly higher spatial frequencies.

15. Method according to claim 1, wherein at least one of the following methods is applied for reconstruction purposes:
shift & sum method;
shift & multiply method;
Wiener deconvolution or Lucy-Richardson deconvolution in combination with shift and sum or shift and multiply methods;
joint or multi-view Lucy-Richardson deconvolution;
single value decomposition method, in particular in combination with a regularization, in particular inverse filtering with a Tikhonov regularization;
deconvolution with point spread functions containing stray light components in particular.

16. Method according to claim 1, wherein at least two partial objects, which are reconstructed from two different partial data records created from the measured image data record, are combined to form a three-dimensional overall object.

17. Method according to claim 16, wherein the combination of the three-dimensional overall object is brought about by a superimposition of at least two partial objects, which each emerge from different partial data records of the image data record by reconstruction.

18. Method according to claim 16, wherein at least one of the following methods is performed for the purpose of superimposing the partial objects to form the overall object:
addition of the partial objects in the spatial domain;
weighted addition of the partial objects in the spatial domain;
multiplication of the partial objects in the spatial domain;
weighted multiplication of the partial objects in the spatial domain;
addition of the partial objects in the spatial frequency domain;
weighted addition of the partial objects in the spatial frequency domain.

19. Method according to claim 1, wherein a partial object is reconstructed from the partial data record in step c), in that a light field image data record is simulated for the partial object,
in that the simulated light field image data record is compared with the partial data record, and
in that subsequently at least one of the following steps is performed:
storing a result of the comparison;
outputting and/or displaying the result of the comparison to a user;
depending on the result of the comparison, creating a recommendation for a user in respect of further steps for the reconstruction of an object;
changing the creation of the partial data record in step b).

20. Method according to claim 1, wherein the steps of:
creating a partial data record;
reconstructing an object from the created partial data record;
simulating a light field image data record from the reconstructed object;

comparing the simulated light field image data record with the partial data record;

changing the creation of the partial data record in step b)

are performed multiple times in succession until a resultant partial data record has been obtained, for which the comparison with the simulated light field image data record supplies a sufficiently good correspondence.

21. Method according to claim 20, wherein an object is reconstructed for the resultant partial data record and/or for the partial data record corresponding to the original image data record minus the resultant partial data record.

22. Method according to claim 1, wherein object regions indicating reconstruction artefacts are searched for in the three-dimensional object reconstructed from a partial data record, in that subsequently at least one of the following steps is carried out:
storing found object regions;
outputting and/or displaying the found object regions to a user;
depending on the found object regions, creating and outputting and/or displaying a recommendation to a user in respect of further steps for the reconstruction of an object;
correcting the found object regions indicating reconstruction artefacts.

23. Method according to claim 22, wherein those pixels of the object whose picture values are outside of value intervals to be defined are assessed as object regions indicating artefacts.

24. Method according to claim 1, wherein a corrected object is created by virtue of pixels in the object whose picture values are outside of value intervals to be defined, in particular pixels with negative picture values, being set to values to be defined, in particular to zero.

25. Method according to claim 1, wherein a difference data record is calculated by forming the difference between the measured image data record and a light field image data record simulated for a three-dimensional object, in particular a corrected three-dimensional object.

26. Method according to claim 25, wherein image regions indicating reconstruction artefacts are searched for in the difference data record, and in that at least one of the following steps is carried out:
storing found image regions;
outputting and/or displaying the found image regions to a user;
depending on the found image regions, creating and outputting and/or displaying a recommendation to a user in respect of further steps for the reconstruction of an object;
correcting the found image regions indicating reconstruction artefacts.

27. Method according to claim 25, wherein those pixels of the difference data record whose picture values are outside of value intervals to be defined are assessed as image regions indicating artefacts.

28. Method according to any of claims 25, wherein a corrected difference data record is created by virtue of pixels in the difference data record whose picture values are outside of value intervals to be defined, in particular pixels with negative picture values, are set to values to be defined, in particular to zero.

29. Method according to claim 1, wherein the following method steps are performed:
reconstructing an object from the image data record or a partial data record with a reduced spatial resolution, created from the image data record, for a volume containing regions of the sample (5) of interest;
creating a reduced partial object by setting the picture values of the object to a value to be defined, in particular to zero, for all pixels in a target region in which the regions of the sample (5) of interest are situated;
simulating a light field image data record for the reduced partial object;
creating a difference data record by forming the difference between the originally measured image data record and the light field image data record simulated for the reduced partial object;
reconstructing a partial object from the difference data record.

30. Method according to claim 29, wherein the target region is determined by evaluating the partial object reconstructed with reduced spatial resolution.

31. Apparatus for light field microscopy comprising: a light source for emitting excitation light:
an illumination beam path for guiding the excitation light onto or into a sample;
a two-dimensionally spatially resolving detector for detecting
light emitted by the sample;
a detection beam path at least having a microscope objective (4) and a multi-lens array (9) for imaging light (6) emitted by the sample (5) onto the detector (11);
a control and evaluation unit (12) for controlling the light source (1) and the detector (11) and for evaluating the measured data obtained from the detector (11), with the control and evaluation unit (12) being configured to control the light source (1) and the detector (11) to record at least one image data record of the sample (5); and
wherein the control and evaluation unit (12) is also configured
to perform the method according to claim 1.

* * * * *